Dec. 8, 1925.

E. L. LEINBACH

SHOCK ABSORBER

Filed Feb. 7, 1925

Inventor
Edward L. Leinbach

Dec. 8, 1925.  E. L. LEINBACH  1,564,865
SHOCK ABSORBER
Filed Feb. 7, 1925    2 Sheets-Sheet 2

Inventor
Edward L. Leinbach,
By Jochum Atty.

Patented Dec. 8, 1925.

1,564,865

UNITED STATES PATENT OFFICE.

EDWARD L. LEINBACH, OF CHICAGO, ILLINOIS.

SHOCK ABSORBER.

Application filed February 7, 1925. Serial No. 7,496.

*To all whom it may concern:*

Be it known that I, EDWARD L. LEINBACH, a citizen of the United States, and residing at Chicago, in the county of Cook, State of Illinois, have invented certain new and useful Improvements in Shock Absorbers, of which the following is a specification.

This invention relates to improvements in shock absorbers particularly adapted, though not necessarily limited in its use for controlling the action of supporting springs of vehicles and especially for the purpose of retarding or modifying the action of the springs when they are subjected to violent shocks and rebounds due to obstructions and irregularities in the road bed.

A further object is to provide an improved shock absorber of this character which will permit the vehicle springs to have a limited degree of free movement under normal conditions and during which time the shock absorber will be inactive with respect to modifying or retarding the spring action, but which will quickly and automatically be rendered active by the slightest abnormal condition.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating the invention and in which drawings, Figure 1, is a side elevation of a shock absorber constructed in accordance with the principles of this invention and with a portion of the casing or housing removed.

Figure 2:
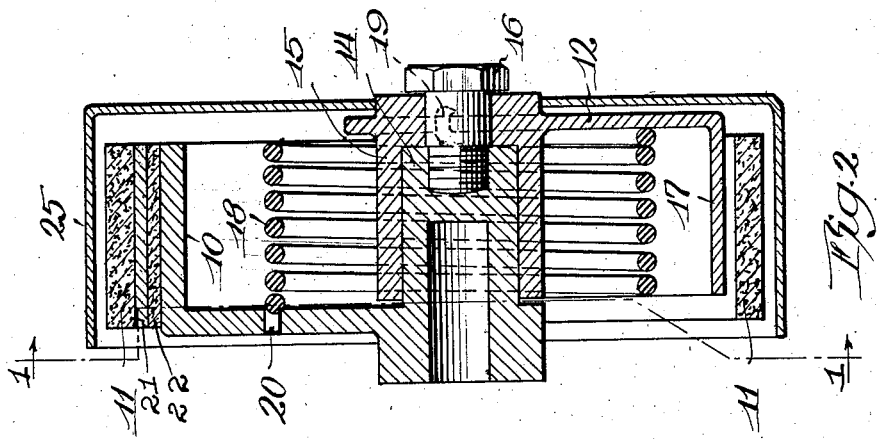
Figure 2, is a sectional view taken on line 2—2 Figure 1.
Figure 1:
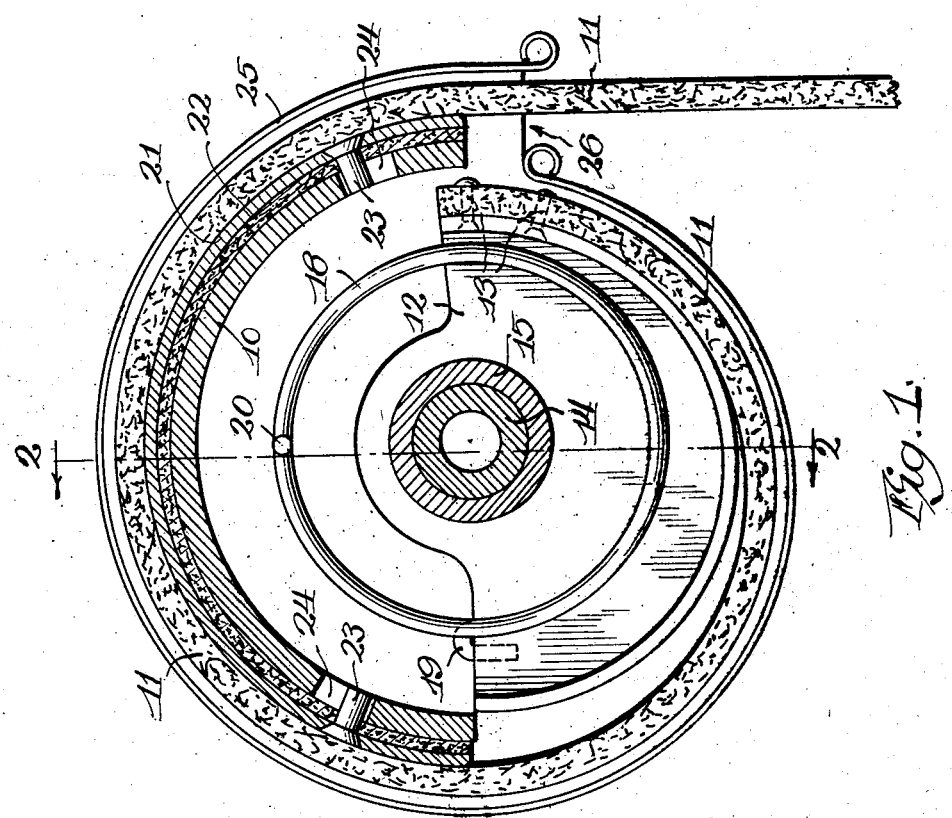

Referring more particularly to the drawings and to the form of the invention shown in Figures 1 and 2, the numeral 10 designates a surface over which a belt or strap 11 is adapted to slide. One end of the belt is secured to a pivotally mounted member 12 as at 13, and the other end of the belt is connected in any suitable manner, not shown, to a suitable portion of the vehicle.

The member 12 is mounted to freely rotate about a hub or axle 14, connected with the stationary member 10, preferably through the medium of a hub 15 and the member 12 is held against displacement in any suitable manner such as by means of a nut 16.

The belt 11 contacts with a flanged portion 17 of the member 12 and is wound thereupon. The member 10 is held against rotation in any suitable manner, such as by being fastened to a portion of the vehicle (not shown).

An elastic member such as a coil spring 18 is provided for returning or imparting a retrograde movement to the member 12 when the latter is rotated in one direction by the belt 11, one end of the spring being connected as at 19 to the member 12 preferaby by engaging over one edge of the member and the other end of the spring is anchored as at 20 to the stationary member 10, the spring being coiled about the hub 15 and axle 14.

It will therefore be seen that when a stress is imparted to the belt 11 when the parts, one direction of movement of which it is desired to retard, are separated, the member 12 will be moved across the surface of the stationary member 10 and when the stress is relieved to permit the parts to move toward each other, the belt 11 will be moved across the said surface in the opposite direction through the medium of the stress or energy stored in the spring 18 during the movement of the member 12 under the stress of the belt 11.

Interposed between the surface of the member 10 and that portion of the belt 11 which travels thereon, is a floating friction creating element 21 constructed of any suitable resilient material and rests against or contacts with the belt 11. This element may be constructed in any suitable manner and is of a comparatively resilient nature and preferably has secured thereto a facing or surface 22, which latter rests against or contacts with the adjacent portion of the surface of the member 10, so that as the belt 11 is moved back and forth, the element 21—22 will be likewise moved.

As long as the element 21 is free to move or travel with the belt 11, there will be created a comparatively small degree of friction between the element 22 and the surface of the member 10, but by arresting the movement of the member or element 22—21 with respect to the member 10 and the belt 11, an increased friction will be created between the element and the belt sufficient to retard or modify the relative movement of the parts.

Any suitable means may be provided for thus arresting the movement of the element 21, but a simple and efficient means embodies lugs or pins 23 which are carried by and project from the face of the element, and enter elongated slots or openings 24 in the member 10.

In operation the element 21 will move with the belt 11 in either direction of movement of the latter and across the surface of the member 10 until the lugs or pins 23 contact the respective ends of the slots or openings 24, according to the direction of movement of the belt 11. When however, the lugs contact with the ends of the respective slots, the movement of the element 21 will be arrested and any further movement of the belt 10 in the same direction will cause the belt to drag across the element 21 thereby increasing the degree of friction between these parts and the action of the belt 11 will be thereby modified or retarded.

It is desirable with shock absorbers of this character to provide in their operation what is called a "neutral point." That is, a point at which the vehicle springs will be permitted to have a limited degree of free movement under normal conditions and during which time the shock absorber should be inactive with respect to modifying or retarding the vehicle spring motion, and at the same time provide means whereby the shock absorbed will be automatically and quickly rendered active by the slightest abnormal condition or action of the vehicle springs.

With the present invention the "neutral point" in the operation of the device will be maintained while the element 21 is being oscillated back and forth over the surface of the member 10 by the belt 11 and the pins or lugs 23 are moving back and forth in the respective slots 24. When however, the pins or lugs engage the ends of the respective slots 24, the point of neutrality will be overcome, as the bodily movement of the element 21 will be arrested, and the relative movement of the parts will be modified or retarded by the friction created between the element 21 and the adjacent or contacting portion of the belt 11.

The material of which the portion 22 of the element 21 is constructed should be such that it will slide freely over the surface of the member 10.

A housing 25 may be provided for encasing the parts and which housing may be provided with an opening 26 through which the belt 11 moves.

Figure 3:
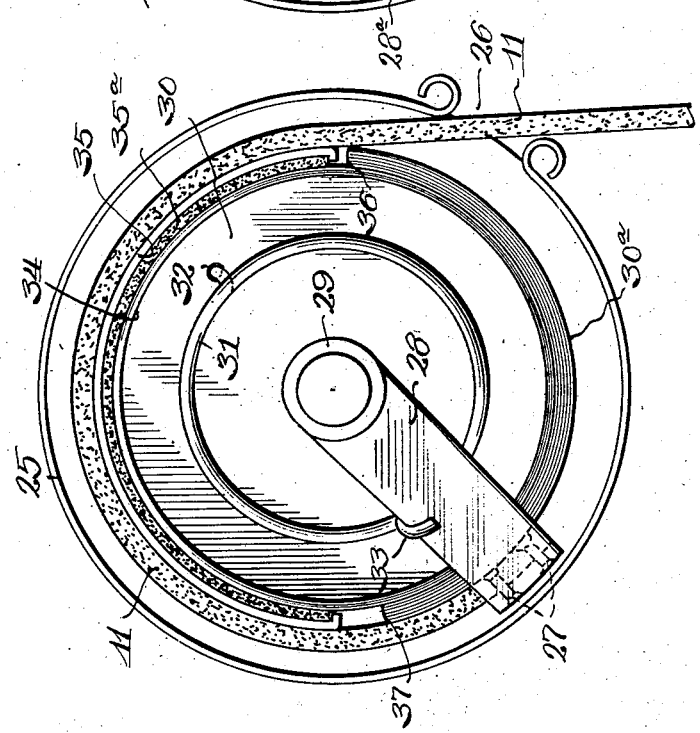
Figure 3, is a view similar to Figure 2 showing another form of the invention.

In the form of the invention shown in Figure 3, one end of the belt 11 is connected as at 27 to an arm 28 which latter is pivotally supported as at 29 upon a suitable bearing carried by a stationary member 30. A coil spring 31 is anchored by one end as at 32 to the stationary member 30 and the other end of the spring is connected as at 33 with the arm 28 and tends to move the arm in a direction to wind or take up the slack of the belt 11.

The member 30 is provided with a surface 34 over which the belt 11 passes and interposed between the surface 34 and the adjacent portion of the belt is a floating friction creating element 35 of a resilient nature and is adapted to be freely oscillated across the surface 34 by the belt 11. A surfacing material 35$^a$ may be secured to the element 35 and contacts with the surface 34 of the member 30 and is formed of any suitable material which will slide freely over the surface 34.

Under normal conditions the element 35 will be moved back and forth over the surface 34 and between spaced stationary stops 36—37 and during such oscillation of the element 35 the neutral point in the shock absorber will be maintained. That is, the shock absorber will during that time be inactive with respect to modifying or retarding the action of the vehicle springs. When however, the ends of the element 35 abut the respective stops 36—37 the floating or bodily movement of the element 35 will be arrested and the degree of friction between the element 35 and the adjacent portion of the belt 11 will be increased and the device will become active to retard or modify the action of the vehicle springs.

Figure 4:
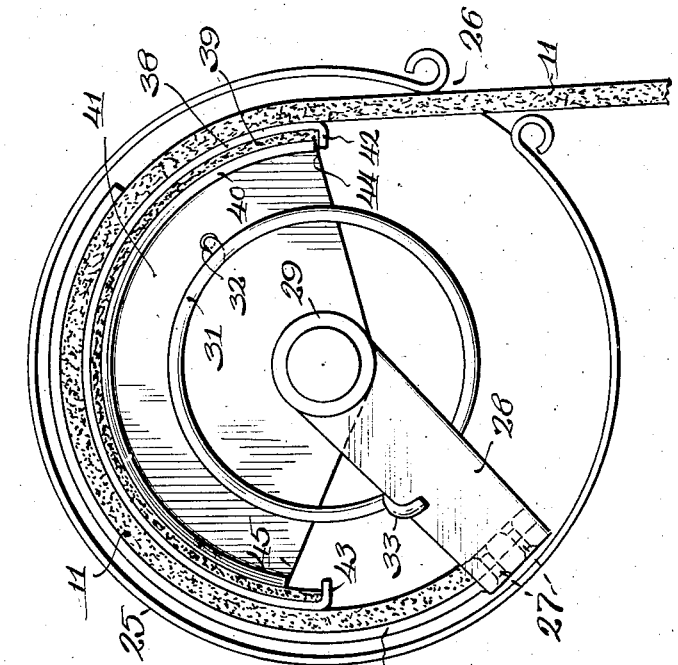
Figure 4, is a view similar to Figure 2 showing still another form of the invention.

The action of the form of the invention shown in Figure 4, is the same as described in connection with the form shown in Figure 3, with the exception that in Figure 4 the floating resilient friction creating element 38 has connected with it a surface 39 which contacts with the surface 40 and is of any suitable material that will move freely over the surface 40 of a stationary member 41. The ends 42—43 of the friction element 38 are deflected to project beyond the surface of the element 39 that engages the surface 40 of the member 41, a sufficient distance that they may be brought into engagement respectively with the edges or shoulders 44—45 of the stationary member 41, when the element 38 is bodily moved to such an extent by the belt 11 and in directions to cause such engagement.

In operation the "neutral point" in the action of this form of shock absorber will be maintained during the movement of the element 38—39 over the surface 40, until one of the other of the extremities 42—43 of the floating element 38 contacts with the respective shoulders 44—45, at which time the bodily movement of the element 38 will be arrested and the device will become active with respect to modifying or controlling the action of the vehicle springs by the increased friction created and the relative movement between the element 38 and the adjacent portion of the belt 11.

The belt 11 in the form of the invention shown in Figure 1 will be maintained against bending or making a sharp turn after it leaves the surface 10, by the periphery of the member 12, while in the form of the invention shown in Figure 3, the same result is accomplished by the portion 30ª of the casing 30, the ends of which portion 30ª form the stops 36—37.

In the form of the invention shown in Figure 4, the same result is accomplished by means of a shoe like element 28ª carried by the arm 28 and against which shoe the belt or element 11 rests.

While the preferred forms of the invention have been herein shown and described it is to be understood that various changes may be made in the details of construction and in the combination and arrangement of the several parts, within the scope of the claims, without departing from the spirit of this invention.

What is claimed as new is:

1. A shock absorber including a pivotally mounted member, a belt secured at one of its ends to the said member and adapted to move the member in one direction about its pivot, a stationary surface over which the belt moves, means for moving the said member in one direction about its pivot, a floating friction creating element interposed between the said surface and the adjacent portion of the said belt and having contact with both, whereby said element may be freely oscillated by the belt over the surface, and means for arresting the bodily movement of the said element to cause a relative movement of the belt and the said element one with relation to the other.

2. A shock absorber including a pivotally mounted member, a belt secured at one of its ends to the said member and adapted to move the member in one direction about its pivot, a stationary surface over which the belt moves, means for moving the said member in one direction about its pivot, a floating friction creating element interposed between the said surface and the adjacent portion of the said belt and having contact with both, whereby said element may be freely oscillated by the belt over the surface, and means operatively related to the said element and the said surface for arresting the bodily movement of the said element with the said belt to cause a relative movement of the belt and the said element one with relation to the other.

3. A shock absorber including a stationary surface, a belt movable forwardly and backwardly over said surface, means for moving the belt in one direction across said surface and against the stress of which means the belt is movable in the opposite direction across said surface, a friction creating element interposed between the belt and the said surface and freely movable by the belt across the said surface, and formations on the said element and the said surface for arresting the movement of said element with the belt to cause a relative movement of the belt with respect to the said element.

4. A shock absorber including a stationary surface, a belt movable forwardly and backwardly over said surface, means for moving the belt in one direction across said surface and against the stress of which means the belt is movable in the opposite direction across said surface, a friction creating element interposed between the belt and the said surface, and formations on the said element and the said surface for arresting the movement of said element with the belt to cause a relative movement of the belt and element one with respect to the other, and in both directions of movement of the said element and belt.

5. A shock absorber including a stationary surface, a belt movable forwardly and backwardly over said surface, means for moving the belt in one direction across the surface and against the stress of which means the belt is movable in the opposite direction, a floating friction creating element contacting with the surface of the belt, said element being bodily and freely movable with and with respect to the belt surface, and a fixed abutment for arresting the movement of the said element with the belt to cause a relative movement of the belt and said element one with relation to the other.

6. A shock absorber including a stationary surface, a belt movable forwardly and backwardly over said surface, means for moving the belt in one direction across the surface and against the stress of which means the belt is movable in the opposite direction, a floating friction creating element contacting with the surface of the belt, said element being bodily and freely movable with and with respect to the belt surface, a fixed abutment for arresting the movement of the said element with the belt to cause a relative movement of the belt and said element one with respect to the other, and a housing enclosing all of the said parts and through the wall of which housing the belt passes.

In testimony whereof I have signed my name to this specification, on this 5th day of February, A. D. 1925.

EDWARD L. LEINBACH.